United States Patent [19]

Beuk et al.

[11] Patent Number: 5,797,085
[45] Date of Patent: Aug. 18, 1998

[54] WIRELESS COMMUNICATION SYSTEM FOR RELIABLE COMMUNICATION BETWEEN A GROUP OF APPARATUSES

[75] Inventors: Leonardus G.M. Beuk; Hans E.P. Köhler; Robertus C.J. Jansen; Adrianus H. Van Gerwen, all of Eindhoven, Netherlands

[73] Assignee: U.S. Phillips Corporation, New York, N.Y.

[21] Appl. No.: 637,256

[22] Filed: Apr. 24, 1996

[30] Foreign Application Priority Data

Apr. 28, 1995 [EP] European Pat. Off. ............ 95201102

[51] Int. Cl.$^6$ ........................................................ H04B 1/40
[52] U.S. Cl. ........................... 455/88; 455/517; 370/328
[58] Field of Search ................................. 455/68, 69, 88, 455/422, 517; 370/346, 347, 348, 442, 443, 444, 445, 447, 448, 449, 328, 349; 371/20.1, 32, 33, 34, 37.1, 37.7, 61

[56] References Cited

U.S. PATENT DOCUMENTS

| 5,311,172 | 5/1994 | Sadamori ............................ 340/825.5 |
| 5,422,887 | 6/1995 | Diepstraten et al. ................. 370/85.3 |
| 5,502,724 | 3/1996 | Chen et al. ............................ 370/85.3 |

FOREIGN PATENT DOCUMENTS

3508562A1 9/1986 Germany .................. G08C 25/02

Primary Examiner—Andrew I. Faile
Assistant Examiner—Christopher Onuaku
Attorney, Agent, or Firm—Debra Stephens; Anne Barschall

[57] ABSTRACT

The communication system allows a group of at least three apparatuses, such as game computers and Personal Digital Assistants (PDAs), to communicate wirelessly by using, for instance, infrared transmission. The apparatuses are the same from a communication point of view. A message frame (500) transmitted by an apparatus (10) can, therefore, be received by all other apparatuses (101 e.a.), which are part of the system. Reliability is increased by acknowledging correct reception of a message frame (500) and retransmitting a message frame (500) up to a predefined maximum number of times if no acknowledgement frame (510) is received. The chance of message frames (500) and/or acknowledgement frames (510) colliding is reduced. After a message frame (500) has been transmitted, a following defined time period is reserved for acknowledging reception of the message frame (500). Upon receiving the message frame (500), the receiving apparatuses (101 e.a.) wait a random time, within the defined period, before acknowledging. The first apparatus (101) to time-out transmits an acknowledgment frame (510). The other apparatuses do not transmit an acknowledgement frame. Correct reception of a message frame (500) is, therefore, only acknowledged by one apparatus. This is accomplished through use of two timers.

10 Claims, 5 Drawing Sheets

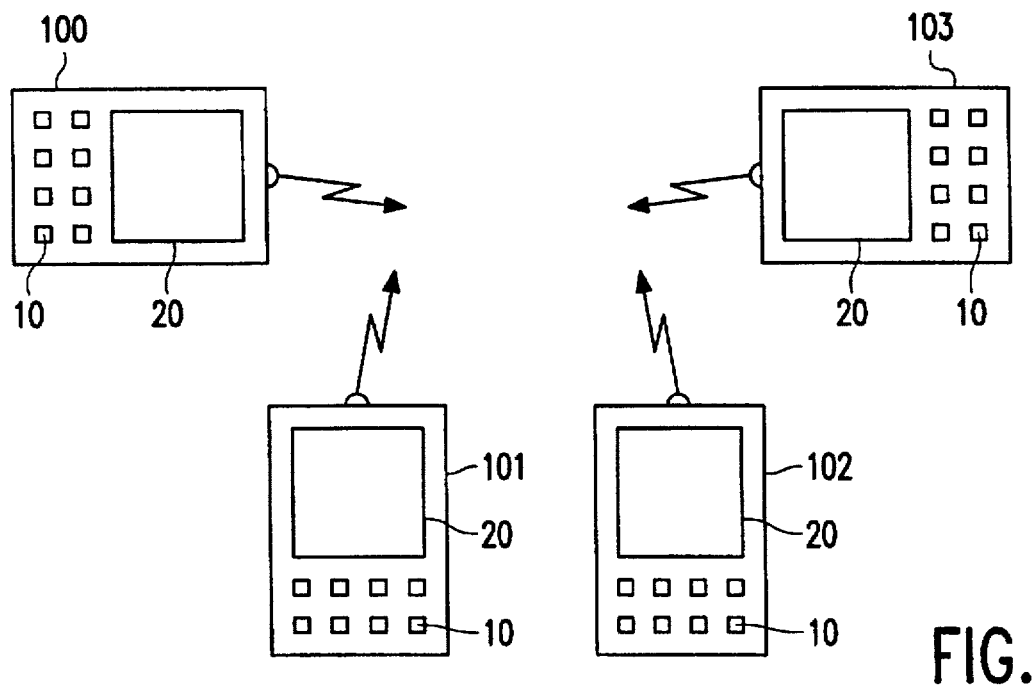
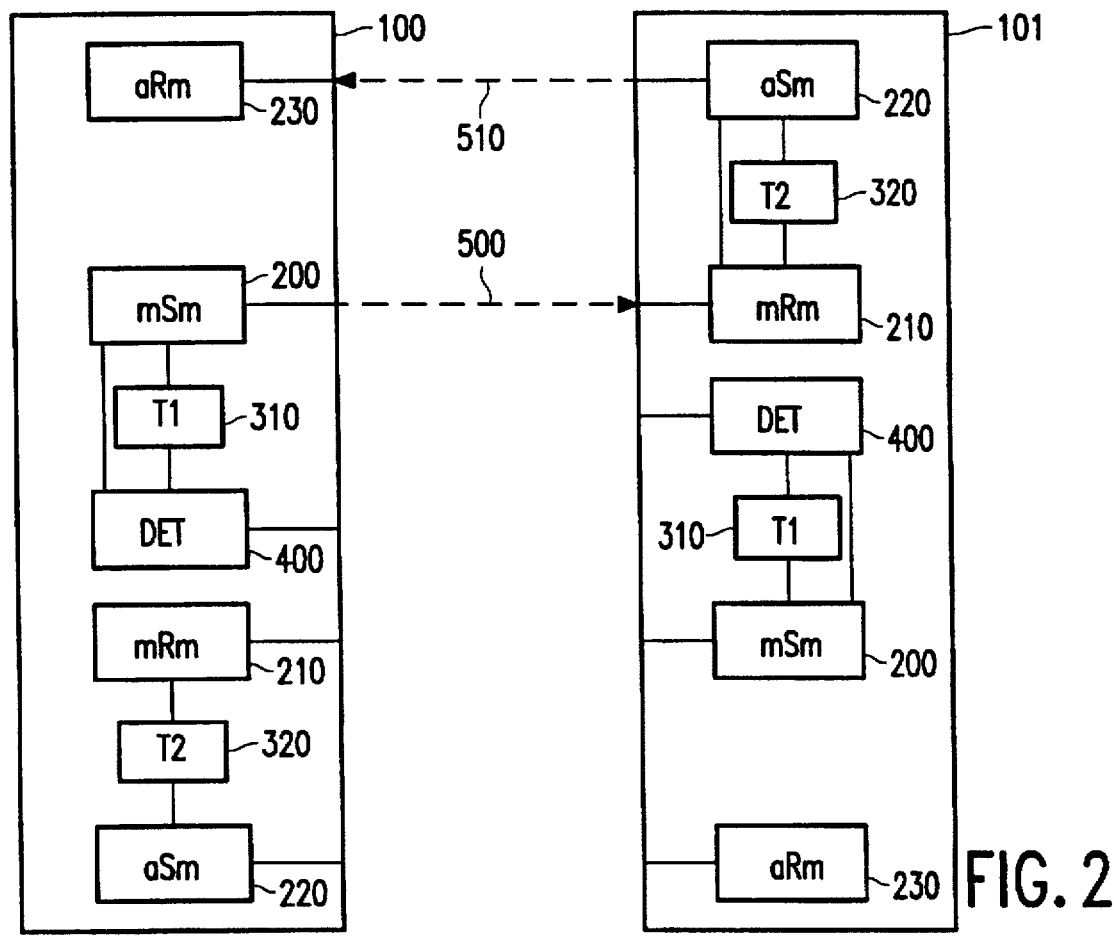
FIG. 1
FIG. 2

WIRELESS COMMUNICATION SYSTEM FOR RELIABLE COMMUNICATION BETWEEN A GROUP OF APPARATUSES

BACKGROUND OF THE INVENTION

The invention relates to a wireless communication system including a sending apparatus and a receiving apparatus. The sending apparatus has a message sending unit for transmitting a message frame, and acknowledge receiving unit for receiving acknowledgement frame. The receiving apparatus has a message receiving unit for receiving a message frame, and acknowledge sending unit for transmitting acknowledgement frame when the message receiving units correctly receives a message frame.

The invention further relates to apparatuses suitable for use in such a system.

Communication between two apparatuses can occur in many ways. Wireless communication is widely used for communication involving portable apparatuses. For consumer electronics products, infrared light is commonly used as a carrier for wireless communication. In known infrared communication systems, a sending apparatus, such as a hand-held remote control, comprises an infrared transmitter and a receiving apparatus, such as a television, comprises an infrared receiver. The information is transmitted in the form of message frames. The message frames are limited to a maximum size, allowing the transmitting and receiving apparatus to use buffers with a corresponding maximum size for temporarily storing the message frames. By using simple communication protocols and operating at low bit-rates, cost-effective communication is achieved. Typically, the protocols are executed by the main CPU, requiring no dedicated logic or communication ICs in addition to an infrared transmitter or an infrared receiver. A transmission via infrared, however, can easily be disrupted, for instance, by other infrared transmitters operating at the same frequency. In order to increase reliability of such communication systems, the communication protocols have been enhanced by using acknowledgement mechanisms to report correct reception of a transmitted frame. If no acknowledgement frame is received in response to transmitting a message frame, the message frame may be retransmitted. This may, for instance, take place on the initiative of the user, by pressing the same key on the remote control again. Also the sending apparatus may automatically retransmit the message frame, up to a predetermined maximum or until an acknowledgement frame has been received. The acknowledgement mechanism can also be used to detect that no communication was possible, for instance, in situations where the maximum operating distance is exceeded or optical contact is broken. To support the acknowledgement mechanism, both apparatuses comprise an infrared transmitter and an infrared receiver. Such a system is known from DE-A-3508562.

This system describes the communication between two apparatuses, with the sending apparatus generating message frames and receiving acknowledgement frames; and the receiving apparatus receiving message frames and generating acknowledgement frames in response. The addition of a third apparatus may cause the system to fail.

Such a situation arises, for instance, if a VCR also receives the message frames, transmitted by the TV's remote control, and generates acknowledgement frames in response. The transmission of one message frame could then result in two acknowledgement frames being transmitted nearly simultaneously (one by the TV and one by the VCR), resulting in interference and no acknowledgement being received. This situation is usually avoided by assigning unique addresses to receiving apparatuses. A message frame transmitted by the remote control comprises the address of a specific receiving apparatus. Only the addressed apparatus will receive the message frame and acknowledge it. Typically, apparatuses come with a factory-set address or offer the user a choice of addresses, such as a choice between the logical addresses 'VCR1' and 'VCR2' for a VCR. Making every apparatus unique, from a communication point of view, has obvious advantages. The drawback is, however, that information, which is relevant for more than one apparatus, needs to be transmitted several times, each time addressed to another apparatus. For example, after copying a home movie, a user may need to issue three stand-by commands on remote control(s) to bring the television, VCR1 and VCR2 into standby mode.

Similarly the system can fail if two remote control are present to control the same television. Nearly simultaneous use of the two remote controls will result in two message frames interfering. Automatic repetition of the transmission can result in repeated interference, particularly if the repetition rates are similar. If the second remote control transmits a second message frame shortly after the first remote control has transmitted a first message frame, the second message frame may interfere with the acknowledgement frame for the first message frame. If the second message frame is transmitted before the first message frame is acknowledged, confusion may arise to which message frame is actually acknowledged by the acknowledgement frame.

SUMMARY OF THE INVENTION

It is an object of the invention to provide a wire-less communication system, allowing communication between at least three apparatuses, which are the same from a communication point of view. It is a further object of the invention that such a system is capable of reducing the chance that one transmitted message frame results in multiple acknowledgement frames interfering. It is also an object of the invention to reduce the chance of message frames interfering.

To achieve this object, the system according to the invention is characterised in that the system comprises at least three apparatuses; each apparatus being a sending apparatus as well as a receiving apparatus, each apparatus further comprising:
- detection means for detecting a transmission of a frame,
- first timing means for setting a first timer at a predetermined first time upon said detection means detecting the ending of said transmission, and
- second timing means for, upon said message receiving means correctly receiving a message frame, setting a second timer at a random time with a predetermined upper boundary; said predetermined upper boundary being smaller than said first time;

said message sending means being adapted to transmit a message frame when said first timer is expired and said detection means detect no transmission of another frame; and said acknowledge sending means being adapted to transmit an acknowledgement frame only if said second timer expires prior to said detection means detecting a transmission of another frame.

In order to achieve reliable and cost-effective communication between a group of apparatuses, the invention uses the following mechanisms:

1. A message frame and an acknowledgement frame form a 'synchronous' pair. Once a message frame has been transmitted, a first time period, governed by the first timer, is reserved exclusively for returning an acknowledgement frame. The use of synchronous pairs ensures that the transmitting and receiving apparatuses can perform the necessary operations sequentially (no parallel activities are required).
2. A message frame is only acknowledged by one receiving apparatus. For many applications, a sufficient level of reliability is achieved if the transmitting apparatus is informed that at least one apparatus has received the message frame correctly. This is achieved in two ways:

A random delay, governed by a second timer, is used before transmitting the acknowledgement frame. The timer is set upon receipt of a message frame. This reduces the chance of a plurality of apparatuses nearly-simultaneously starting the transmission of an acknowledged frame. The random delay has an upper boundary, which is less than the first time, ensuring that the transmission of the acknowledgement frame starts before the transmission of another message frame.

The apparatuses detect (sense) whether a frame is transmitted during the random delay period. If so (implying that another apparatus had a shorter delay and has already started transmitting an acknowledgement frame), no other acknowledgement frame is transmitted.
3. Only one apparatus at a time transmits a message frame (followed by the transmission of an acknowledgement frame by a receiving apparatus). The apparatuses detect (sense) whether a frame is being transmitted. If a transmission is detected, no transmission of another message frame is started. At the end of the detected transmission, the first timer is set (ensuring that the pair is not broken). When the timer expires, a transmission of another message frame may start. To ensure that no other apparatus has already started a transmission, an apparatus first checks again whether a transmission is active or not. This mechanism offers a reasonable protection against messages frames interfering with one another, particularly for systems in which relatively few message frames are transmitted and the message frames are transmitted on the initiative of the users.

A first embodiment of a system according to the invention is characterised in that said first timing means is adapted to set said first timer at a random time within a time window; said time window being chosen from a plurality of predetermined, non-overlapping time windows, with the time window, which most closely follows said detection of the ending of a transmission of a frame, being reserved for transmitting a message frame with highest priority and each successive time window being reserved for transmitting a message frame with a successively lower priority.

In particular, when message frames are generated automatically by the apparatuses or relatively high numbers of frames need to be transmitted, the situation can occur that a transmission of a frame delays at least two apparatuses to nearly the same moment in time (governed by the first timer). In such a situation those apparatuses could start transmitting without detecting that another transmission has simultaneously started. To reduce the chance of this happening, the first timer is set at a random time within a pre-determined time window. Additionally, the random time window is divided in at least two, non-overlapping time windows, making it possible to prioritise the transmission of message frames. High priority message frames use the first time window; low priority message frames use a later time window.

In a communication system the sending apparatus may further comprise third timing means for setting a third timer at a predetermined third time after the message sending means has transmitted a message frame; the message sending means being adapted to retransmit the message frame up to a predetermined maximum number of times if the third timer expires prior to the acknowledge receiving means receiving an acknowledgement frame. A further embodiment of the system according to the invention is characterised in that each apparatus comprises said third timing means;

in that said message sending means is adapted to divide a long message over a series of message frames and to sequentially transmit said series of message frames; each successive message frame of the series being different from the immediately preceding message frame and a successive message frame being transmitted after an acknowledgement frame for the immediately preceding message frame has been received by said acknowledge receiving means;

in that said message receiving means is adapted to receive a series of message frames and to distinguish between successive message frames of the series; and in that said acknowledge sending means is adapted to transmit said acknowledgement frame, upon said message receiving means correctly receiving a message frame of said series, only if said message receiving means has correctly received all preceding message frames of said series.

In this embodiment, long messages are divided over a series of message frames. The message frames are transmitted in sequence. The next message frame of the series is only transmitted after the current message frame has been acknowledged. If no acknowledgement is received, the current message frame is automatically retransmitted. In an environment with a high chance of disruption of the transmission, it is advantageous to retransmit individual message frames instead of retransmitting the entire series of message frames. The situation may also occur that a receiving apparatus has acknowledged a message frame, but that the acknowledgement frame was not correctly received by the apparatus which transmitted the message frame. In such a situation, the transmitting apparatus will retransmit the message frame. To ensure that the receiving apparatus can differentiate between a retransmission and a transmission of the next message frame of the series, each successive message frame of the series is different from the immediately preceding message frame. As described earlier, it is desired that at least one apparatus receives a message correctly. Similarly, it is desired that at least one apparatus correctly receives a long message, being the entire series of message frames. A message frame is acknowledged by no more than one apparatus. The situation could occur that each individual message frame of the series is acknowledged, but that no apparatus has correctly received the entire message. For instance, of a long message, which is divided over two message frames, the first message frame might be received by apparatus A only and acknowledged by apparatus A and the second message frame might be received by apparatus B only and acknowledged by apparatus B. To overcome this, an apparatus only acknowledges correct receipt of a message frame if it has correctly received all preceding message frames of the series.

In a further embodiment according to the invention, the system is characterised in that the acknowledge sending means is adapted to transmit the acknowledgement frame only if the acknowledge sending means has transmitted an acknowledgement frame for all preceding message frames of said series. To increase the chance of a long message being received, the apparatus, which acknowledged the first message frame of the series, is the only apparatus which acknowledges the remaining message frames of the series.

In a further embodiment according to the invention, the system is characterised in that a message frame, which is the first of a series of message frames, is assigned a lower priority than the remaining message frames of the series. This ensures that, once the transmission of a long message has started, the long message has gained priority. Otherwise it is possible that, particularly in systems in which a large number of messages are transmitted, every individual message frame of the series would have to compete with all messages to be transmitted by the other apparatuses. This could potentially make the duration of the transmission very long. The described system is, therefore, particulary advantageous for infrared based systems in which the chance of loosing optical contact increases if the transmission takes a long time.

In a further embodiment according to the invention, the system is characterised in that message frames of a series of message frames comprise a number which is different for successive message frames of the series. Using numbers is a simple way of distinguishing between successive frames. For example, numbers can be used which are sequentially higher for successive message frames of the series. In an alternative embodiment, the system is characterised in that successive message frames of the series alternatingly comprise the number zero or one. Using this mechanism, only one bit location in the message frame needs to be reserved for this number, which allows the receiving apparatus to simply differentiate between a retransmission and a transmission of the next message frame of the series.

In a further embodiment according to the invention, the system is characterised in that

- each apparatus comprises checksum calculation means for calculating a checksum representing a series of message frames;
- said message sending means is adapted to cause said checksum calculation means to calculate a first checksum representing the series of message frames to be transmitted by said message sending means; said message sending means inserting said first checksum in a predetermined message frame of the series;
- said message sending means is further adapted to insert in the last message frame of the series an indication that this message frame is the last message frame of the series;
- said message receiving means is adapted to cause said checksum calculation means to calculate a second checksum representing the series of message frames received by said message receiving means;
- said acknowledge sending means is adapted to, upon said message receiving means receiving the last message frame of the series, transmit said acknowledgement frame only if said first checksum comprised in said predetermined message frame of the series received by said message receiving means matches said second checksum.

The checksum allows the receiving apparatuses to determine whether all message frames of the series have been received correctly. If a receiving apparatus detects an error, it does not acknowledge the last message frame of the series. In this manner, the sending apparatus can detect that not only individual message frames have been correctly received but that the entire message has been received. An additional advantage occurs when using infrared based communication, particularly for portable apparatuses. In such systems optical contact can easily be broken. Without precautions this could result in the following scenario: an apparatus A starts transmitting a series of message frames. Apparatus B receives the series. Apparatus C does not receive the beginning of the series and starts transmitting a series of message frames as well (for example, the user only points C towards the other apparatuses when C needs to transmit a message). Both apparatus A and B receive the series of message frames transmitted by C. As a consequence apparatus A looses the arbitration and stops transmitting (actually C won the right to transmit by not arbitrating correctly). In the end, B has received a series of message frames partly originating from A and partly originating from C. Advantageously, the checksum allows B to detect this and inform C by not acknowledging the last message frame.

BRIEF DESCRIPTION OF THE DRAWINGS

These and other aspects of the invention will be described in detail hereinafter with reference to the drawing.

FIG. 1 illustrates a system of four apparatuses, which are able to communicate wirelessly, FIG. 2 shows a block-diagram of an apparatus for a system according to the present invention.

DESCRIPTION OF PREFERRED EMBODIMENTS

Figure 3:
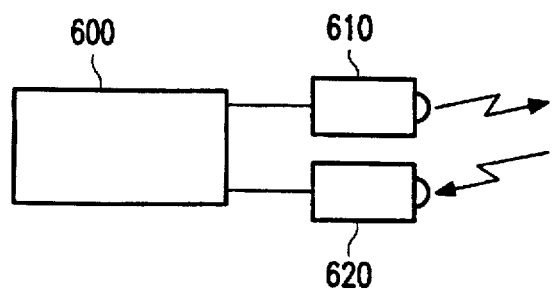
FIG. 3 shows a block-diagram of a micro-controller-based implementation.

The system according to the invention comprises a group of at least three apparatuses, which are able to communicate wirelessly. FIG. 1 illustrates such a system comprising four apparatuses 100 to 103. The described system can be used for various remote control applications, but is also particularly suited for hand-held communicators. For instance, a group of children, each having a hand-held game computer, can play a group game, by each child providing local input into his game computer and his game computer communicating the relevant information to the other game computers. Moreover, the system also enables children to work together as a team, with each child contributing to the task which the team wants to solve. As an example, the children could solve a complex puzzle, by each child solving part of the puzzle on his game computer and these partial solutions being communicated by his game computer to the other game computers. As another example, a Personal Digital Assistant (PDA) can be extended with various applications, which benefit from group communication. Such a PDA could allow a child to enter a note and send it to the PDAs of all classroom mates. For these types of group applications, a sufficient level of reliability is achieved if at least one apparatus receives a transmitted message frame. Since groups are established very dynamically (children may come and go), it is not required that every apparatus receives the message frame. It may even give surprising effects if a message pops up on the display of some, but not all apparatuses. This can easily give the impression that the transmitted object has a life of its own.

It will be recognised that the described system is particularly suited for these types of group applications, where each apparatus is the same from a communication point of view and groups of communicating apparatuses are established dynamically. The simplicity of the described wireless communication system allows cost-effective implementations, which are very important for game computers and children's PDAs. Infrared communication is particularly cost-effective and has the additional advantages that the communication is restrained to one room and is free of governmental regulations. In situations where communication is required over larger distances, for instance neighbouring children who would like to communicate using their PDAs, the same system can be used using simple RF transmission technology, as is known from, for instance, walkie-talkies.

The apparatuses themselves may be different. For example, for interactive television four similar remote controls can be used to communicate to an intelligent interface box. The interface box may, in turn, be connected to the broadcasting studio via a telephone connection. Each user can enter selections or answers on the remote control and transmit these to the interface box. The interface box transmits this information to the studio. Similarly, the studio can transmit data, such as questions, to the interface box, which in turn transmits it to all remote controls. In this example, five apparatuses of two types (four remote controls and one interface box) are involved. The invention only relates to the communication between the five apparatuses; the communication between the interface box and the broadcasting studio is outside the scope.

Besides being equipped for wireless communication, the apparatuses of FIG. 1 will typically comprise input means 10, such as a keypad, and a display 20, such as an LCD display. Preferably, for the display 20 a graphics tablet is used, which also allows input via a pen or finger-presses.

FIG. 2 illustrates a block-diagram of an apparatus for a system according to the present invention. For clarity, two apparatuses, 100 and 101, are shown. Each apparatus comprises message sending means 200 for transmitting a message frame, message receiving means 210 for receiving a message frame, acknowledge sending means 220 for transmitting an acknowledgement frame, and acknowledge receiving means 230 for receiving an acknowledgement frame. In FIG. 2, apparatus 100 takes the initiative to transmit a message frame. The initiative may be taken automatically, for instance on the initiative of a program, or, alternatively, be triggered by an external event, such as a user pressing a key. Various methods for detecting external events, such as a micro-controller scanning a keyboard, are known and not described here. As a result, the message sending means 200 of apparatus 100 transmits a message frame 500. The message receiving means 210 of apparatus 101 receives the message frame 500. The message receiving means 210 also verifies whether the message has been received correctly. Various methods are known for this, such as checking the bit timing (e.g. bi-phase encoding), checking whether the parity matches parity bits comprised in the message frame or checking whether a calculated checksum, such as a CRC, matches the checksum comprised in the message frame. Based on such a method, a receiving apparatus can come to the conclusion that a message frame has not been received correctly. If no error has been detected the receiving apparatus assumes that the message frame has been received correctly.

Each apparatus further comprises second timing means 320. When the message receiving means 210 correctly receives a message frame, the second timing means 320 sets a second timer at a random time, with a predetermined upper boundary 72. In this example, this happens when apparatus 101 correctly receives the message frame 500. The acknowledge sending means 220 do not transmit an acknowledgement frame until the second timer expires. Apparatuses other than apparatus 101 may also have correctly received the message frame 500 and started a second timer. The second timer of one of the receiving apparatuses will time-out first. The acknowledge sending means 220 of that apparatus will transmit an acknowledgement frame 510. Each apparatus further comprises detection means 400 for detecting a transmission of a frame. If the detection means 400 of an apparatus, which is waiting for the second timer to expire, detects a transmission of another frame before the second timer expires, no acknowledgement frame is transmitted. Alternatively, the detection means 400 may, upon detecting the transmission of a frame, prevent the second timing means 320 from expiring, also resulting in no acknowledgement frame being transmitted. The use of the random timer and the detection of frame transmissions ensures a high chance of not more than one apparatus acknowledging the message frame 500. If at least one apparatus has received the message frame 500 correctly, the acknowledge receiving means 230 of apparatus 100 will receive an acknowledgement frame 510. Obviously, other apparatuses may detect and receive the same acknowledgement frame 510, but since these apparatuses are not expecting an acknowledgement frame, the frame will be discarded.

Each apparatus can take the initiative to transmit a message frame. Consequently, the transmission of a message frame initiated by a first apparatus could interfere with the transmission of a message frame initiated by another apparatus or with the transmission of an acknowledgement frame. The detection means 400 are also used to reduce the chance of this happening. If the detection means 400 detect a transmission, the message sending means 200 delays starting the transmission of another message frame. When the detection means 400 detects the end of a transmission, a first timing means 310 sets a first timer at a predetermined first time T1. When the first timer expires, the message sending means 200 may start the transmission of another message frame. Since another apparatus may have been delayed by detecting the same transmission, it is advantageous to check again whether a transmission is active or not, before actually starting the transmission. This mechanism offers a reasonable protection against message frames interfering with one another, particularly for systems in which relatively few message frames are transmitted and the message frames are transmitted on the initiative of the users. It will be appreciated that, instead of setting the timer at the end of detecting a transmission of a frame, the timer may also be set at another moment during the frame transmission, such as the start of the frame. In many systems in which the maximum length (and duration) of a frame are known this will lead to similar results. In some systems, such as for instance infrared based systems, interferences, interpreted by the detection means 400 as a transmission of a frame, can occur which exceed the predetermined first time T1. In such systems it is particularly advantageous to set the timer at the end of detecting the transmission or interference.

Additionally, the predetermined first time T1 is chosen to be longer than the predetermined upper boundary T2 of the second timer set by the second timing means 320. This ensures that a message frame and the corresponding acknowledgement frame form a 'synchronous' pair. Once a message frame has been transmitted, the first time period, governed by the first timer, is reserved exclusively for returning the acknowledgement frame. Advantageously, the use of synchronous pairs ensures that the transmitting and receiving apparatuses can perform the necessary operations sequentially (no parallel activities are required).

An apparatus may, while it transmits a message frame or an acknowledgement frame, disable any reception of frames. Alternatively, it may be able to receive while it transmits and, advantageously, check for any disturbance of the transmission.

Both the message sending means 200 and the acknowledgement sending means 220 transmit a frame. Obviously, both means can partly be combined. For instance, using infrared-based communication, both means could advantageously share an encoding circuit and a modulation circuit, where the encoding circuit is used for encoding the frame into, for instance, a bi-phase signal and the modulation circuit is used for transmitting an infrared light signal onto which the encoded signal is modulated. Typically, the modulation involves modulating the signal onto a subcarrier, which is typically in the range of 33 to 40 KHz., and subsequently modulating the subcarrier onto the infrared carrier. Similarly, the message receiving means 210, the acknowledge receiving means 230, and the detection means 400 can share a demodulation circuit for receiving the infrared light signal and demodulating it into an encoded signal. The message receiving means 210 and the acknowledge receiving means 230 can, further, share a decoding circuit for decoding the received encoded signal into a frame. Particularly, if the apparatus already comprises a micro-controller, for example of the type PCA 84C822 of the Firm of Philips, it is advantageous to combine the message sending means 200, the message receiving means 220, the acknowledge sending means 220 and the acknowledge receiving means 230 with the micro-controller. The first timing means 310 and second timing means 320 are preferably combined with the timing functions of the micro-controller. In practice, the modulation and demodulation circuits are kept separate from the micro-controller. In situations where the real-time requirements of the micro-controller allow for this, it is advantageous to combine the first modulation step (modulating the signal onto a subcarrier) with the microcontroller.

FIG. 3 shows an implementation using a micro-controller. A micro-controller 600 uses a modulation circuit 610 for modulating a subcarrier on an infrared light signal. An example of such a modulation circuit, also referred to as infrared LED, is LD2475 of the Firm of Siemens. A demodulation circuit 620 receives the infrared light signal and demodulates it into a digital signal, which is supplied to the micro-controller 600. An example of such a demodulation circuit is TFNS 5360 of the Firm of Telefunken.

Figure 4:
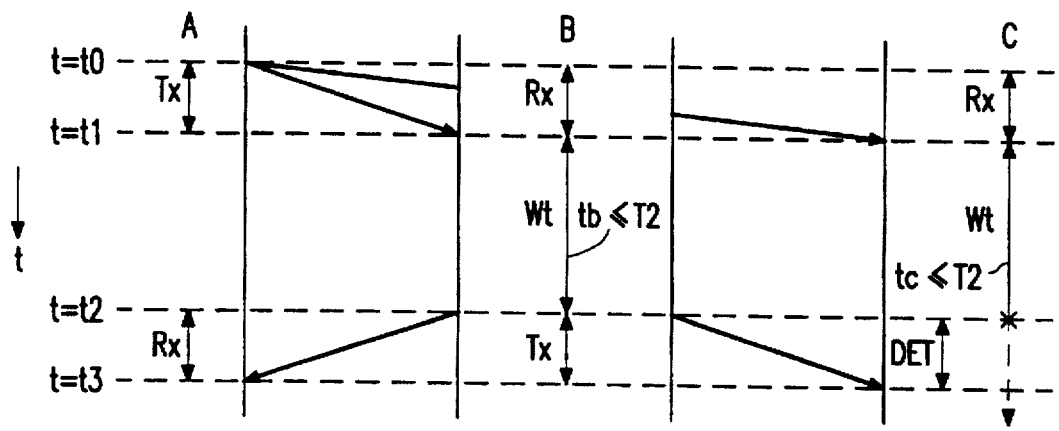
FIG. 4 shows a flow-diagram, illustrating the role of the second timer in avoiding getting two acknowledgements.

FIG. 4 illustrates the use of the second timer in avoiding getting two acknowledgements. As an example, an interaction between three apparatuses A, B and C is shown. The interaction starts at time $t=t_0$. It is assumed that at that moment no other interactions are active and that all timers have expired. At $t=t_0$ A starts sending (Tx) a message frame. At the same time B and C detect the transmission and start receiving (Rx) the message frame. At $t=t_1$ the transmission ends. At this moment B and C have received the message frame and, if no error is detected, both apparatuses start the second timer at a random time, $t_b$ and $t_c$ respectively with a predetermined upper boundary $T_2$ ($t_b \leq T_2$; $t_c \leq T_2$). B and C wait (Wt) for the timer to expire before transmitting an acknowledgement frame. In this example, $t_b$ is the shortest time ($t_b < t_c$). At $t=t_2$ the second timer in B expires. Since B has detected no transmission in between $t=t_1$ and $t=t_2$, B starts transmitting an acknowledgment frame at $t=t_2$. C detects (DET) this transmission also at $t=t_2$, implying that C will no longer transmit an acknowledgement frame.

Figure 5:
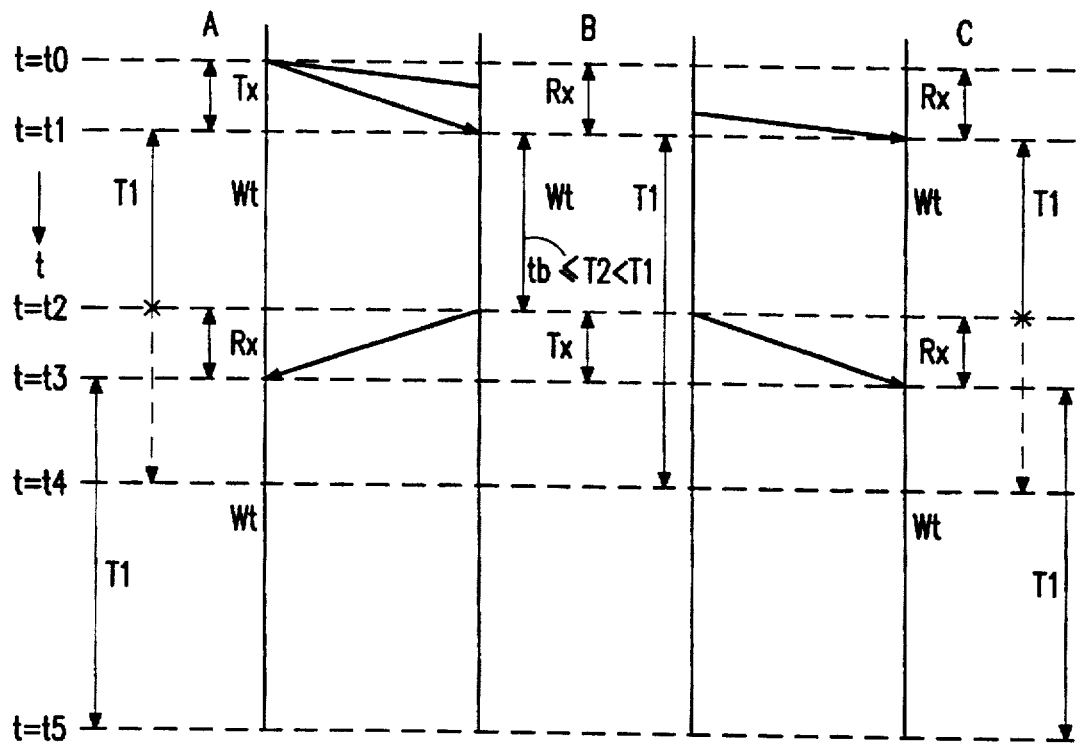
FIG. 5 shows a flow-diagram, illustrating the role of the first timer in avoiding that message frames interfere with one another.

FIG. 5 illustrates the use of the first timer in avoiding that message frames interfere with one another. As an example, an interaction between three apparatuses A, B and C is shown. The interaction starts at time $t=t_0$. It is assumed that at that moment no other interactions are active and that all timers have expired. At $t=t_0$, A starts sending Tx) a message frame. At the same time B and C detect the transmission and start receiving (Rx) the message frame. At $t=t_1$, A stops transmitting and B and C detect the end of the transmission. A, B and C start the first timer at the predetermined first time $T_1$. They wait (Wt) with transmitting another message frame until the first timer has expired. For simplicity it is assumed that only B has received the message frame correctly (the situation that both receive the message frame correctly has been described previously). B starts the second timer (for acknowledging) at a random time $t_b$ with the predetermined upper boundary $T_2$ ($t_b \leq T_2$). B waits (Wt) for the second timer to expire. This happens at $t=t_2$. Subsequently, B starts transmitting an acknowledgment frame. A and C detect this transmission also at $t=t_2$. At $t=t_3$, B stops transmitting the acknowledgement frame and A and C detect the end of the transmission. A and C restart the first timer at the predetermined first time $T_1$. At $t=t_3$, A has received the acknowledgement frame. Also C may have received the acknowledgement frame and subsequently discard it, since C is not expecting an acknowledgement frame. Alternatively, C may have stopped receiving the acknowledgement frame as soon as C detected that it was an acknowledgement frame. No transmission of a new message frame is started as long as the first timer has not expired or the transmission of a frame is detected.

So, from the start of the transmission of the first message frame at $t=t_0$, no new message frame may be generated until $t=t_4$ for B (first timer expires in B) or $t=t_5$ for A and C (first timer expires in A and C). If B is also able to detect its own transmission, B may also have reset the first timer at $t=t_3$, resulting in the first timer also expiring in B at $t=t_5$. It should be noted that the upper boundary $T_2$ for the second timer is less than the predetermined time $T_1$ for the first timer. This ensures, that the acknowledgement frame is transmitted before a new message frame may be transmitted. In practical implementations, a certain margin of time may be required in between $T_1$ and $T_2$ to allow for processing delays. Additionally, the system may use automatic gain control to adapt to the correct levels of the received signals.

In this case, it is beneficial to also define a minimum time for the second timer. In the example of FIG. 4, it could otherwise happen that B almost instantly acknowledges the reception of the message frame, whereas the automatic gain control in A has reduced the sensitivity of the reception circuitry in A while A was transmitting the message frame. As a consequence, A may not be able to receive the acknowledgement frame correctly. The minimum period win allow the automatic gain control circuitry to return to a high level of sensitivity.

From FIG. 5 it is clear that the transmission of a message frame delays the transmission of another message frame. If during that period two or more apparatuses want to transmit a new message frame, the apparatuses may be delayed to a similar moment in time (A and C are delayed to $t=t_5$ in the example of FIG. 5). If the processing delays in A and C are very similar, it could occur that both start transmitting at nearly the same time and are not able to detect that a transmission has already started before they actually started transmitting themselves. To overcome this problem, in a further embodiment the first timer is started at a random time within a time window. As can be seen from FIG. 5, the lower time boundary of the time window must be higher than the upper boundary $T_2$ of the second timer, in order to ensure that the message-acknowledge pair can not be broken by a new message frame. The time window for the first timer is further broken down in at least two non-overlapping time windows. The first of these time windows is reserved for transmitting a message frame with highest priority. The successive time windows are reserved for transmitting a message frame with a successively lower priority. The first time window is the time window for sending a new message frame which most closely follows the moment at which the detection means 400 detect the ending of a transmission of a frame. It should be noted that as long as there are high priority message frames to be transmitted, a low priority message frame will be delayed (the first timer will be restarted by detecting the transmission of a high priority message frame). Similarly, only one high priority message frame will be transmitted at a time, and the other high priority message frames will be delayed.

Figure 6:
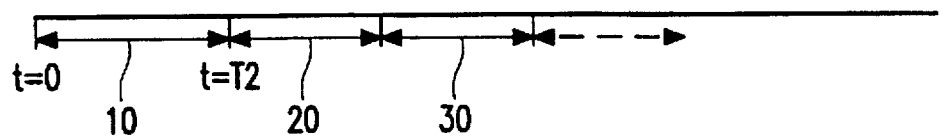
FIG. 6 illustrates the time windows used for the transmission of message frames and acknowledgement frames.

FIG. 6 illustrates the time windows used for the transmission of message frames and acknowledgement frames. Assuming that at t=0 the end of a transmission of a message frame is detected, the time window 10 is reserved for sending an acknowledgement frame. The actual moment at which the acknowledgement frame is transmitted is random, within this time window. The time window has a predetermined upper boundary $T_2$. The time window 20, being the first window after $T_2$, is reserved for transmitting a high priority message frame. If an apparatus wishes to transmit a high priority message frame, the actual moment at which the message frame is transmitted is random, within this time window 20.

The following time window 30 is reserved for the next priority message frame, and so on. It should be noted that if a high priority message frame is transmitted, the detection of the transmission will reset the timers. So a lower priority message frame will only be transmitted if no apparatus wants to transmit a high priority message.

Figure 7:
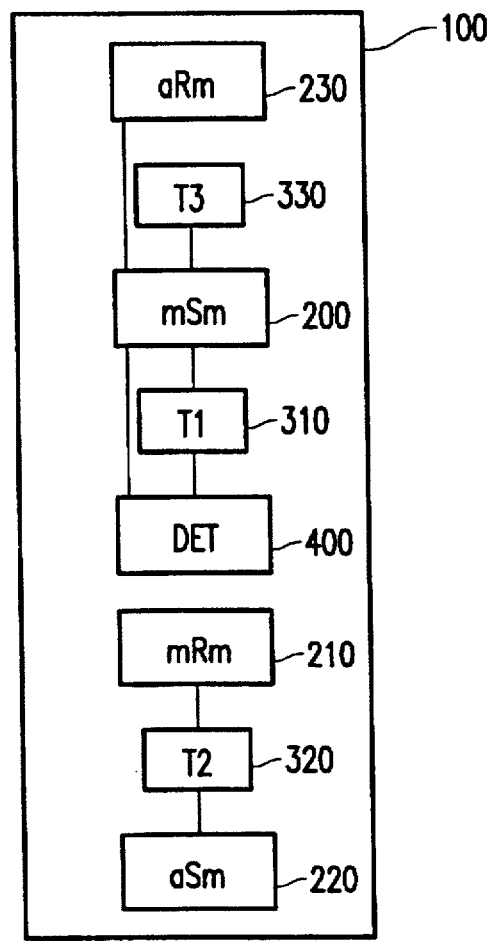
FIG. 7 shows a block diagram of a further embodiment of an apparatus for a system according to the invention.

In a further embodiment, as shown in FIG. 7, the message sending means 200 is adapted to divide a long message over a series of message frames and to sequentially transmit the series of message frames. Additionally, the message receiving means 210 is adapted to receive a series of message frames. It should be noted that the message sending means 200 may actively divide a message into message frames, or, alternatively, a message may already have been stored as a series of message frames. Typically, message frames are limited in length (and, therefore, also in transmission time). The length is usually chosen in such a way that it matches the application. As an example, if message frames are only used to transfer simple instructions, like the user pressing a key on a remote control, a data length of up to two bytes might be sufficient. For more complex situations, like the user programming a VCR on the remote control and transmitting the series of instructions in one operation, the use of a larger frame size, such as 16 data bytes, is beneficial. For applications, such as described earlier, in which drawings or letters need to be transmitted, even larger sizes would be required. Increasing the frame size too much, however, causes problems. Besides increasing the buffer sizes (extra costs) also the reliability is reduced. This could particularly for infrared communication result in an unreliable system.

The reliability is, therefore, increased by retransmitting a message frame if no acknowledgement frame is received for the message frame. To this end, each apparatus comprises third timing means 330, for setting a third timer at a predetermined third time T3, after the message sending means 200 has transmitted a message frame. If the third timer expires before the acknowledge receiving means 230 receiving an acknowledgement frame, the message sending means 200 retransmit the message frame, up to a predetermined maximum number of times. The acknowledge receiving means 230 may inform the message sending means 200 that a correct acknowledgement frame has been received or, alternatively, stop the third timing means 330 from expiring. The maximum number of retransmissions could for instance be three. For infrared based communication a higher number, such as sixteen, is preferred, since infrared communication can easily be disturbed. The reliability is further increased by adapting the acknowledge sending means 220 to only transmit an acknowledgement frame to acknowledge correct reception of a message frame of a series, if the message receiving means 210 have correctly received all message frames of the series so-far. This avoids the situation in which all message frames of a series have been acknowledged, but that none of the acknowledging apparatuses have received the entire series correctly.

In a further embodiment, the reliability is further increased by adapting the acknowledge sending means 220 to only transmit an acknowledgement frame to acknowledge correct reception of a message frame of a series, if the message receiving means 210 have correctly received all message frames of the series so-far and if the acknowledge sending means 220 has transmitted an acknowledgement frame for all these message frames. This ensures that only one apparatus acknowledges the reception of series of message frames.

Figure 8:
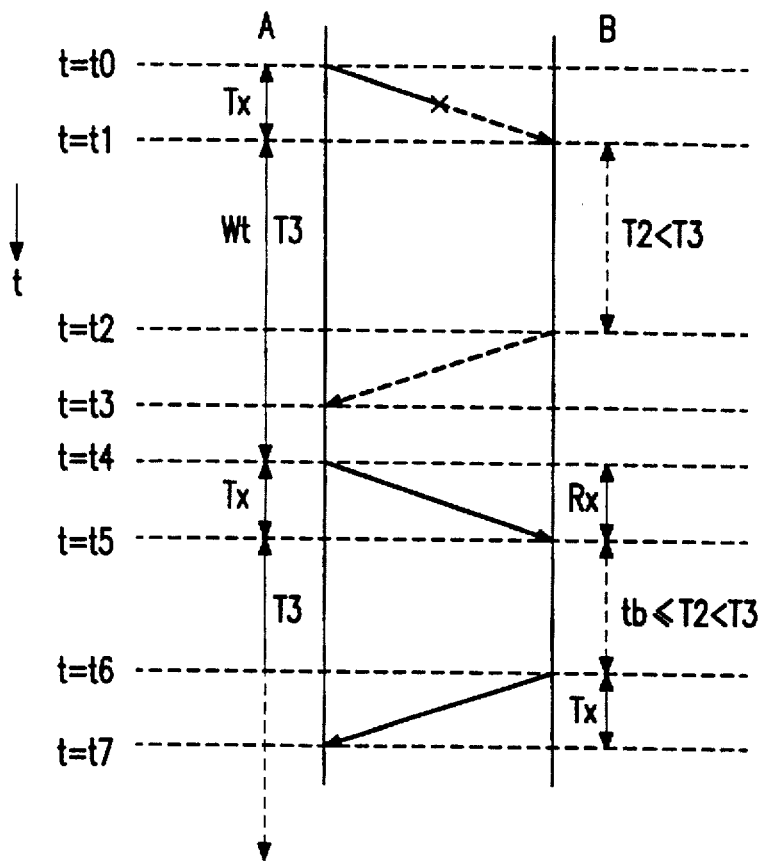
FIG. 8 shows a flow-diagram, illustrating the role of the third timer in retransmitting a message frame.

FIG. 8 shows that the predetermined third time T3 for waiting for the acknowledgement frame must be larger than the predetermined upper boundary T2 for acknowledging the reception of the message frame. At t=t1, apparatus A has finished transmitting (Tx) a message frame. A sets the third timer at T3 and waits (Wt) for the timer to expire. In this example, B did not receive the message frame. If B would have received the message frame, B would have, at t=t1, set the second timer at a random time, with a maximum of T2. In that case, B would have transmitted the acknowledgement frame at the latest during the period t=t2 to t=t3. By ensuring that T3 is larger than T2, A starts retransmitting the message frame at t=t4, when A will no longer receive an acknowledgement frame. Preferably, T3 is sufficiently larger than T2 to allow for some processing delays.

The message sending means 200 of FIG. 7 transmits a successive message frame of a series of message frames only after an acknowledgement frame for the immediately preceding message frame has been received. Without precautions the following situation could occur: apparatus A transmits a message frame of a series to B; B sends an acknowledgement frame, which gets disrupted and is not received by A; A retransmits the same message frame, whereas B expects the next message frame of the series. To cope with this, each successive message frame of the series is different from the immediately preceding message frame, and the message receiving means 210 is able to distinguish between successive frames of the series. Consequently, the message receiving means 210 may discard a message frame, which is part of a series, if it is the same as the previously received message frame.

In a further embodiment, the first message frame of a series, is assigned a lower priority than the remaining message frames of the series. As an example, if a system supports two priorities, the first message frame would have the lowest priority and the successive message frames the highest priority. Using this mechanism, each message initially competes equally for the right to transmit (low priority). Once the transmission of a long message has started, the long message has gained priority. This ensures a quick transmission of a message and reduces the chances of disturbance, particularly for infrared based systems.

Figure 9:
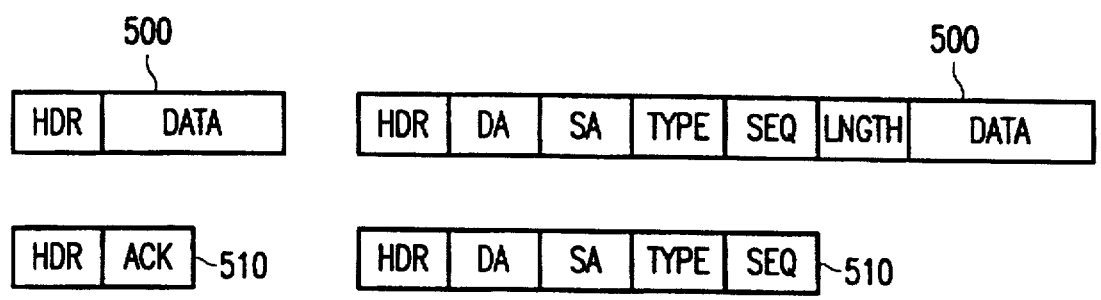
FIG. 9 shows structures of a message and an acknowledgement frame.

The left hand part of FIG. 9 shows a simple structure of a message frame 500 and an acknowledgement frame 510. The message frame 500 contains a DATA field with a variable number of data bytes or bits with a maximum of, for instance, 16 data bytes. The acknowledgement frame 510 contains an ACK field of, for instance, one bit. To simplify clock-synchronisation of the receiving circuit and the detection of the beginning of a frame, a frame may additionally start with a special header field (HDR), such as a special biphase encoded pattern. The right hand part of FIG. 9 shows a more advanced structure of the message frame 500 and the acknowledgement frame 510. The fields DA and SA comprise the address of the destination apparatus (DA) and source apparatus (SA). This implies that the source address of the acknowledgement frame 510 comprises the destination address of the received message frame 500 and the destination address of the acknowledgement frame 510 comprises the source address of the received message frame 500. The system according to the invention does not rely on the use of addresses (apparatuses are the same and do not have unique addresses). It is, however, advantageous to comply to a frame structure which has these fields, albeit using the fields only with fixed addresses, in order to be able to use an existing communication system, where one of the addresses is reserved for the apparatuses according to the invention. While using the reserved address, an apparatus can communicate to the apparatuses of the system according to the invention, following the additional procedures described in this document. Preferably, the same apparatus would also be able to use some of the other addresses to communicate to the rest of the existing communication system, following the basic procedures for that system. As an example, following the basic procedures and frame structure of an existing remote control system, a hand-held game computer according to the invention, can be used as a remote control for a television.

The frame structure shown in the right hand part of FIG. 9 also comprises a field TYPE, of at least one bit, for distinguishing between a message frame and an acknowledgement frame. Using this field, both frame types can use the same frame structure. Although this may increase the size of, particularly, the acknowledgement frame, it has the advantage that a significant part of the software or hardware required to deal with both frame types can be shared. The field LNGTH is used for indicating the length of the following DATA field. Particularly, if the data size varies significantly, it is advantageous to be able to detect the length of the data in a simple way (for instance to be able to determine when to stop receiving). The field SEQ is used for indicating sequence information. As described before, successive message frames of a series are different from the immediately preceding message frame. This can be achieved by inserting in the SEQ field of successive frames a different number. It should be noted that frames, which are not successive, may still have the same number. However, a simple method is to give successive message frames of a series a sequentially higher number. By also using the SEQ field for the acknowledgement frame 510 and copying the number from the SEQ field of the message frame 500, it is made possible to better verify that a received acknowledgement frame indeed acknowledges a message frame, which was transmitted by the apparatus.

Figure 10:
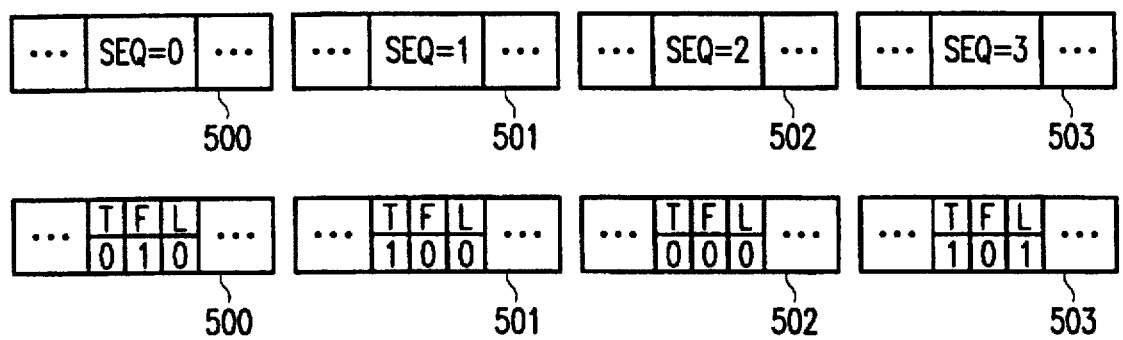
FIG. 10 illustrates a series of four message frames.

The upper part of FIG. 10 illustrates an example of a series of four message frames, in which the SEQ field of successive message frames comprises a sequentially higher number. The first message frame 500 comprises the number zero; the second message frame 501 a one; and so on. The lower part of FIG. 10 illustrates an alternative approach in which the SEQ field is subdivided into three sub-fields T, F and L. The T field comprises alternatingly the number zero or one (toggle bit) for successive message frames of a series. This allows to differentiate between successive message frames. The situation could occur, however, that an even number of successive message frames are not received correctly by a particular apparatus. This apparatus would not be able to detect that. To overcome this, the first message frame comprises a length indicator, which indicates the total number of message frames in the series. In this example, four message frames are in the series. The length indicator could, for instance, be part of the data in the DATA field. To be able to detect that a message frame is the first of a series, the SEQ field comprises a sub-field F, of at least one bit, for indicating this. Additionally, the SEQ field comprises a sub-field L, of at least one bit, for indicating that the message frame is the last of a series. When an apparatus receives the last message frame, it checks whether is has received all message frames. If not, it does not acknowledge the message frame. It should be noted that in such a situation other apparatuses, which did receive all message frames, may still acknowledge reception.

A simple checksum, such as the described length indicator, protects against a limited number of errors. For some systems this level of protection may not be sufficient. For infrared based communication, particularly using portable apparatuses, optical contact can easily be broken. Without precautions this could result in the following scenario: an apparatus A starts transmitting a series of six message frames, with the length being indicated in the first frame. Apparatus B receives the message frames. Apparatus C does not receive the beginning of the series and starts transmitting a series of four message frames (for example, the user only points C towards the other apparatuses when C needs to transmit a message) at the moment when A has only transmitted two message frames. Both apparatus A and B detect the series of message frames transmitted by C. As a consequence, A looses the arbitration and stops transmitting (actually C won the right to transmit by not arbitrating correctly). In the end, B has received a series of six message frames, with the first two frames originating from A and the last four frames originating from C. A length checksum does not allow B to detect that the series is not correct. If required, more advanced checksums can be used, such as parity-based checksums or cyclic redundancy checks (CRC).

Figure 11:
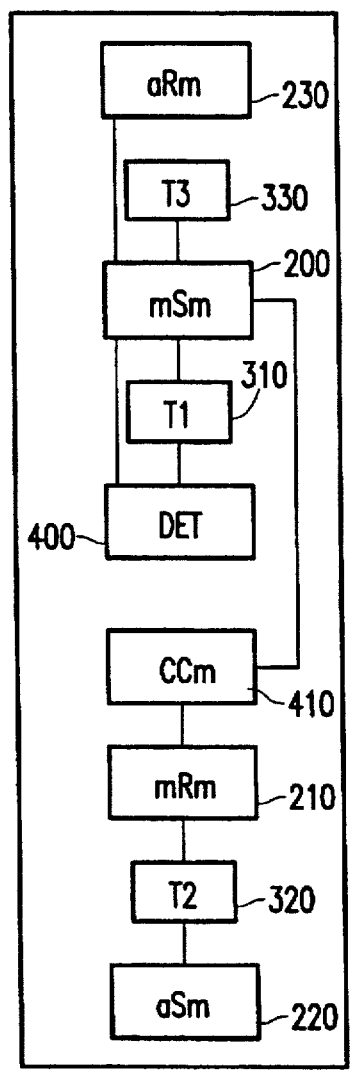
FIG. 11 shows a block diagram of a further embodiment of an apparatus for a system according to the invention.

FIG. 11 shows a further embodiment in which apparatus 100 comprises checksum calculation means 410 for calculating a checksum representing a series of frames. For instance, the checksum could be a CRC calculated over the entire contents of all message frames of the series. It will be appreciated that the checksum may also be simpler and limited to defined fields of the message frame, such as the data field only. The message sending means 200 is adapted to use the checksum calculation means 410 to calculate a checksum over the series of message frames, which the message sending means 200 needs to transmit. The message sending means 200 then inserts the checksum at a predetermined position in a predetermined message frame. Obviously, many different positions can be chosen, such as the first position of the data field of the first message frame of the series or the last position of the last message frame. The series of message frames is received by the message receiving means 210 of one or more other apparatuses. The message receiving means 210 is adapted to use the checksum calculation means 410 to calculate a checksum over the received series of message frames. The message receiving means 210 also extracts the checksum from the predetermined position in the predetermined message frame. The acknowledge sending means 220 is adapted to only transmit an acknowledgement frame for the last message frame of the series if both checksums match. Depending on the choice of the checksum, this may ensure sufficient protection against errors, such as basic transmission errors (resulting in some bits being received wrongly), loss of message frames and concatenation of message frames transmitted by different apparatuses. For a micro-controller based implementation, such as shown in FIG. 3, the micro-controller can advantageously be used to calculate the checksum.

We claim:

1. A wireless communication system comprising:
 a sending apparatus; and
 a receiving apparatus,
 said sending apparatus comprising:
  message sending means for transmitting a message frame, and
  acknowledge receiving means for receiving an acknowledgment frame,
 said receiving apparatus comprising:
  message receiving means for receiving a message frame, and
  acknowledge sending means for transmitting an acknowledgment frame upon said message receiving means correctly receiving a message frame,
 said system comprising at least three apparatuses, each apparatus being a sending apparatus as well as a receiving apparatus, and
 each apparatus further comprising:
  detection means for detecting a transmission of a frame,
  first timing means for setting a first timer at a predetermined first time upon said detection means detecting the ending of said transmission, and
  second timing means for, upon said message receiving means correctly receiving a message frame, setting a second timer at a random time with a predetermined upper boundary, said predetermined upper boundary being smaller than said first time,
  said message sending means being adapted to transmit a message frame when said first timer is expired and said detection means detect no transmission of another frame, and
  said acknowledge sending means being adapted to transmit an acknowledge frame only if said second timer expires prior to said detection means detecting a transmission of another frame.

2. A system as claimed in claim 1, wherein:
 said first timing means is adapted to set said first timer at a random time within a time window; and
 said time window is chosen from a plurality of predetermined, non-overlapping time windows, with the time window, which most closely follows said detection of the ending of a transmission of a frame, is reserved for transmitting a message frame with highest priority and each successive time window is reserved fro transmitting a message frame with a successively lower priority.

3. A system as claimed in claim 2, in which:
 said sending apparatus further comprises third timing means for setting a third timer at a predetermined third time after said message sending means has transmitted a message frame; and
 said message sending means is adapted to retransmit said message frame up to a predetermined maximum number of times if said third timer expires prior to said acknowledge receiving means receiving an acknowledgement frame; characterised:
 in that each apparatus comprises said third timing means;
 in that said message sending means is adapted to divide a long message over a series of message frames and to sequentially transmit said series of message frames; each successive message frame of the series being different from the immediately preceding message frame and a successive message frame being transmitted after an acknowledgement frame for the immediately preceding message frame has been received by said acknowledge receiving means;
 in that said message receiving means is adapted to receive a series of messages frames and to distinguish between successive message frames of the series; and
 in that said acknowledge sending means is adapted to transmit said acknowledgement frame, upon said message receiving means correctly receiving a message frame of said series, only if said message receiving means has correctly received all preceding message frames of said series.

4. A system as claimed in claim 3, wherein a message frame, which is the first of a series of message frames, is assigned a lower priority than the remaining message frames of the series.

5. A system as claimed in claim 1, wherein:
 said sending apparatus further comprises third timing means for setting a third timer at a predetermined third time after said message sending means has transmitted a message frame; and
 said message sending means is adapted to retransmit said message frame up to a predetermined maximum number of times if said third timer expires prior to said acknowledge receiving means receiving an acknowledgement frame;
 each apparatus comprises said third timing means;
 said message sending means is adapted to divide a long message over a series of message frames and to sequentially transmit said series of message frames; each successive message frame of the series being different from the immediately preceding message frame and a successive message frame being transmitted after an acknowledgement frame for the immediately preceding message frame has been received by said acknowledge receiving means;

said message receiving means is adapted to receive a series of message frames and to distinguish between successive message frames of the series; and said acknowledge sending means is adapted to transmit said acknowledgement frame, upon said message receiving means correctly receiving a message frame of said series, only if said message receiving means has correctly received all preceding message frames of said series.

6. A system as claimed in claim 5, wherein said acknowledge sending means is adapted to transmit said acknowledgement frame only if said acknowledge sending means has transmitted an acknowledgement frame for all preceding message frames of said series.

7. A system as claimed in claim 5, wherein message frames of a series of message frames comprise a number which is different for successive message frames of the series.

8. A system as claimed in claim 7, wherein successive message frames of the series alternatingly comprise the number zero or one.

9. A system as claimed in claim 5, wherein:

each apparatus comprises checksum calculation means for calculating a checksum representing a series of message frames;

said message sending means is adapted to cause said checksum calculation means to calculate a first checksum representing the series of message frames to be transmitted by said message sending means, said message sending means inserting said first checksum in a predetermined message frame of the series;

said message sending means is further adapted to insert in the last message frame of the series an indication that this message frame is the last message frame of the series;

said message receiving means is adapted to cause said checksum calculation means to calculate a second checksum representing the series of message frames received by said message receiving means and;

said acknowledge sending means is adapted to, upon said message receiving means receiving the last message frame of the series, transmit said acknowledgement frame only if said first checksum comprised in said predetermined message frame of the series received by said message receiving means matches said second checksum.

10. Apparatus for use in a wireless communication system having at least three similar apparatuses, which apparatus is for sending and receiving messages, the apparatus comprising sending means for transmitting a message frame;

acknowledge receiving means for receiving an acknowledgement frame;

receiving means for receiving a message frame;

acknowledge sending means for transmitting an acknowledgement frame upon said message receiving means correctly receiving a message frame;

detection means for detecting transmission of a frame;

first timing means for setting a first timer at a predetermined first time upon said detection means detecting the ending of said transmission, and second timing means for, upon said message receiving means correctly receiving a message frame, setting a second timer at a random time with a predetermined upper boundary, said predetermined upper boundary being smaller than said first time;

said message sending means transmitting a message frame when said first timer is expired and said detection means detects no transmission of another frame; and said acknowledge sending means being adapted to transmit the acknowledgement frame only if said second timer expires prior to said detection means detecting transmission of the other frame.

* * * * *